United States Patent
Lin et al.

(10) Patent No.: US 11,490,139 B1
(45) Date of Patent: Nov. 1, 2022

(54) SCALER INTEGRATED CIRCUIT APPLICABLE TO PERFORMING MULTI-PICTURE PROCESSING IN DISPLAY DEVICE

(71) Applicant: Realtek Semiconductor Corp., HsinChu (TW)

(72) Inventors: Yuh-Wey Lin, HsinChu (TW); Chun-Hao Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/557,020

(22) Filed: Dec. 20, 2021

(30) Foreign Application Priority Data

Jul. 23, 2021 (TW) .................................. 110127100

(51) Int. Cl.
| | |
|---|---|
| *H04N 21/236* | (2011.01) |
| *H04N 5/45* | (2011.01) |
| *H04N 21/431* | (2011.01) |
| *H04L 65/65* | (2022.01) |
| *H04L 65/75* | (2022.01) |

(52) U.S. Cl.
CPC .......... *H04N 21/236* (2013.01); *H04L 65/65* (2022.05); *H04L 65/75* (2022.05); *H04N 5/45* (2013.01); *H04N 21/4316* (2013.01)

(58) Field of Classification Search
CPC .... H04N 21/236; H04N 21/4316; H04N 5/45; H04L 65/65; H04L 65/75
USPC ........................................................ 375/240.28
See application file for complete search history.

(56) References Cited

U.S. PATENT DOCUMENTS

| | | | |
|---|---|---|---|
| 2007/0296714 A1* | 12/2007 | Kim ...................... | G09G 5/006 345/204 |
| 2017/0012798 A1* | 1/2017 | Teramoto .................. | H04B 3/50 |
| 2020/0302894 A1* | 9/2020 | Khen ........................ | G09G 5/14 |
| 2020/0372852 A1* | 11/2020 | Ishiwata .............. | G09G 3/2096 |
| 2021/0089119 A1* | 3/2021 | Riguer .................. | H04L 65/764 |
| 2021/0105530 A1* | 4/2021 | Lassure ............ | H04N 21/43079 |
| 2021/0373835 A1* | 12/2021 | Wu ........................ | H04W 76/10 |

* cited by examiner

*Primary Examiner* — Dominic D Saltarelli
(74) *Attorney, Agent, or Firm* — Winston Hsu

(57) ABSTRACT

A scaler integrated circuit (IC) applicable to performing multi-picture processing in a display device includes multiple terminals, multiple Extended Display Identification Data (EDID) circuits and a control circuit. The control circuit receives a Multi-Stream Transport (MST) video stream from a video source through a first video input terminal, analyzes the MST video stream to generate a first Single Stream Transport (SST) video stream and a second SST video stream, sends the second SST video stream through a video output terminal to be a video output signal, and receives the video output signal through a second video input terminal, to allow the scaler IC to generate a combination picture according to the first SST video stream and the second SST video stream, for being displayed by a display output module within the display device.

11 Claims, 5 Drawing Sheets

SCALER INTEGRATED CIRCUIT APPLICABLE TO PERFORMING MULTI-PICTURE PROCESSING IN DISPLAY DEVICE

BACKGROUND OF THE INVENTION

1. Field of the Invention

The present invention is related to display control, and more particularly, to a scaler integrated circuit (IC) applicable to performing multi-picture processing in a display device.

2. Description of the Prior Art

According to the related art, when a user wants to use a monitor to display multiple pictures from different video source devices, the user typically needs to connect these video source devices through two or more cables to the monitor to allow the monitor to simultaneously display the multiple pictures in a multi-picture processing mode. These video source devices can be replaced with a same video source device equipped with multiple video output ports. In this situation, when the user wants to use the monitor to display multiple pictures from the multiple video output ports, the user still needs to connect the multiple video output ports to the monitor through two or more cables to allow the monitor to simultaneously display the multiple pictures in the multi-picture processing mode. However, some problems may occur. For example, the two or more cables may occupy limited space, which may cause inconvenience to the user. In addition, the monitor cannot automatically adjust the resolution in the multi-picture processing mode, and the user may need to manually adjust the resolution through the setting mechanism of the video source device (e.g., a certain setting window of an operating system running on the video source device) to achieve the best aspect ratio. Additionally, when the multi-picture processing mode is disabled, multiple sets of screen setting options corresponding to the multiple video output ports may still appear in the setting mechanism such as the setting window. Thus, there is a need for a novel method and associated architecture to realize a display device with reliable display control without introducing a side effect or in a way that is less likely to introduce a side effect.

SUMMARY OF THE INVENTION

It is an objective of the present invention to provide a scaler IC applicable to performing multi-picture processing in a display device, in order to solve the above-mentioned problems.

It is another objective of the present invention to provide a scaler IC applicable to performing multi-picture processing in a display device, in order to guarantee normal operations of a video source device and the display device.

At least one embodiment of the present invention provides a scaler IC which is applicable to performing multi-picture processing in a display device. The scaler IC may comprise a control signal input terminal, a first video input terminal, a second video input terminal, a video output terminal, a first Extended Display Identification Data (EDID) circuit, a second EDID circuit, and a control circuit coupled to the control signal input terminal, the first video input terminal, the second video input terminal, the video output terminal, the first EDID circuit and the second EDID circuit. For example, the control signal input terminal can be arranged to receive a control signal from a user input device in the display device, wherein the control signal indicates whether to enable the multi-picture processing; the first video input terminal can be arranged to receive a first video input signal; the second video input terminal can be arranged to receive a second video input signal; the video output terminal can be arranged to transmit a video output signal from the scaler IC; the first EDID circuit can be arranged to generate a first set of EDID, for performing extended display identification (e.g. extended display capability identification) through a first video input port of the display device; the second EDID circuit can be arranged to generate a second set of EDID, for performing extended display identification (e.g. extended display capability identification) through a second video input port of the display device; and the control circuit can be arranged to control operations of the scaler IC. When the control signal indicates to enable the multi-picture processing, the control circuit can receive a Multi-Stream Transport (MST) video stream from a video source device through the first video input port and the first video input terminal to be the first video input signal, analyze the MST video stream to generate a first Single Stream Transport (SST) video stream and a second SST video stream, send the second SST video stream through the video output terminal to be the video output signal, and receive the video output signal through the second video input terminal to be the second video input signal, to allow the scaler IC to generate a combination picture according to the first SST video stream and the second SST video stream, for being displayed by a display output module within the display device.

It is an advantage of the present invention that, through carefully designed display control mechanism, the scaler IC of the present invention can properly perform the multi-picture processing in a situation where a single cable is connected between the video source device and the display device. In comparison with the related art, the scaler IC of the present invention can realize a display device with reliable display control without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
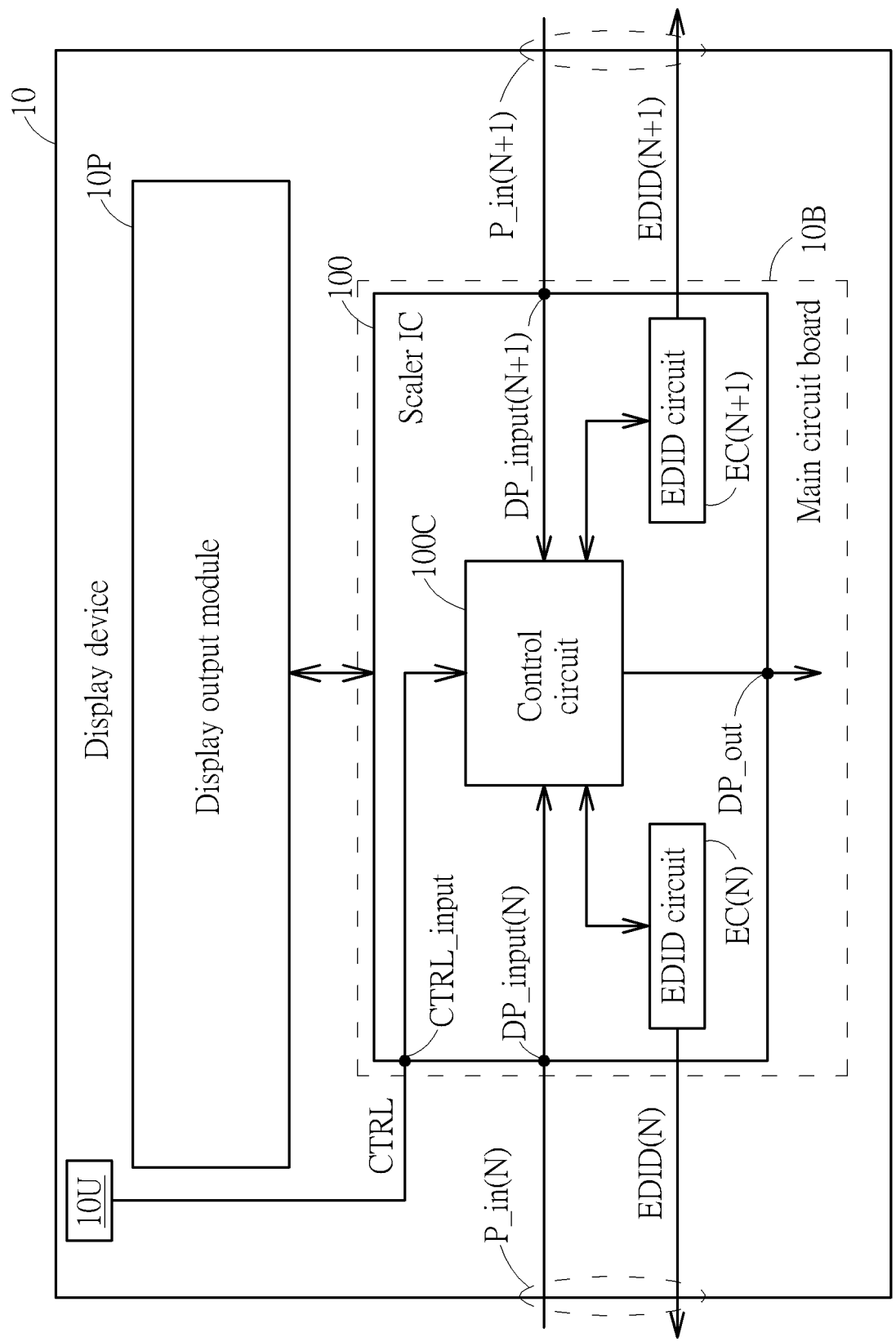
FIG. 1 is a diagram of a scaler IC applicable to performing multi-picture processing in a display device according to an embodiment of the present invention.

FIG. 1 is a diagram of a scaler IC 100 applicable to performing multi-picture processing in a display device 10 according to an embodiment of the present invention, where the scaler IC 100 can be positioned in the display device 10, and more particularly, can be mounted on a main circuit board 10B (e.g., a printed circuit board) of the display device 10, but the invention is not limited thereto. In some embodiments, the main circuit board 10B can be replaced by another circuit board in the display device 10, such as any circuit board of one or more secondary circuit boards.

The display device 10 may comprise a display output module 10P (e.g., a display panel such as a liquid crystal display (LCD) panel), a user input device 10U (which may comprise at least one button and/or an interface circuit), the main circuit board 10B together with the scaler IC 100 thereon, and multiple video input ports such as the video input ports P_in(N) and P_in(N+1), and the scaler IC 100 may comprise a control signal input terminal CTRL_input, a first video input terminal such as the video input terminal DP_input(N), a second video input terminal such as the video input terminal DP input(N+1), a video output terminal DP_out, a first Extended Display Identification Data (EDID) circuit such as the EDID circuit EC(N), a second EDID circuit such as the EDID circuit EC(N+1), and a control circuit 100C, where the control circuit 100C is coupled to the control signal input terminal CTRL input, the first video input terminal such as the video input terminal DP_input(N), the second video input terminal such as the video input terminal DP input(N+1), the video output terminal DP_out, the first EDID circuit such as the EDID circuit EC(N) and the second EDID circuit such as the EDID circuit EC(N+1), but the present invention is not limited thereto. The scaler IC 100 may comprise multiple terminals such as the above terminals and multiple EDID circuits such as the above EDID circuits, and more particularly, the index values N and (N+1) in the symbols of the associated components, signals, etc. can be replaced with any two index values of N_max index values {1, . . . , N_max}, for example, N_max may represent a positive integer greater than one.

In the architecture shown in FIG. 1, the main circuit board 10B (e.g., the scaler IC 100 therein) can be arranged to control operations of the display device 10, and these operations may comprise:

(1) utilizing the display output module 10P to display one or more pictures;
(2) utilizing the user input device 10U to receive one or more user inputs from a user of the display device 10; and
(3) utilizing the display output module 10P to perform on-screen display (OSD) to guide the user to interact with the display device 10, for example, to guide the user to provide any of the one or more user inputs through the user input device 10U;

but the present invention is not limited thereto. Regarding the scaler IC 100, the control circuit 100C can be arranged to control operations of the scaler IC 100, and these operations may comprise:

(1) performing image processing such as scaling processing, image adjustment, the multi-picture processing, etc.;
(2) performing display output control, for example, generate associated control signals for controlling the display output module 10P to perform display operations; and
(3) performing video stream analysis, and more particularly, analyzing a Multi-Stream Transport (MST) video stream to convert the MST video stream into multiple Single Stream Transport (SST) video streams;

but the present invention is not limited thereto. The scaler IC 100 can utilize multiple terminals thereof to perform signal input or output operations. For example, the control signal input terminal CTRL input can be arranged to receive a control signal CTRL from the user input device 10U, wherein the control signal CTRL can indicate whether to enable the multi-picture processing. The first video input terminal such as the video input terminal DP_input(N) can be arranged to receive a first video input signal, and the second video input terminal such as the video input terminal DP input(N+1) can be arranged to receive a second video input signal, and the video output terminal DP out can be arranged to transmit a video output signal from the scaler IC 100. In addition, the scaler IC 100 can utilize one or more EDID circuits thereof to generate one or more sets of EDID, for performing extended display identification (e.g. extended display capability identification). For example, the first EDID circuit such as the EDID circuit EC(N) can be arranged to generate a first set of EDID EDID(N), for performing extended display identification (e.g. extended display capability identification) through a first video input port of the display device 10, such as the video input port P_in(N), and the second EDID circuit such as the EDID circuit EC(N+1) can be arranged to generate a second set of EDID EDID(N+1), for performing extended display identification (e.g. extended display capability identification) through a second video input port of the display device 10, such as the video input port P_in(N+1).

For better comprehension, the multi-picture processing may comprise one or both of Picture-in-Picture (PiP) processing and Picture-by-Picture (PbP) processing. The user of the display device 10 may enable or disable the multi-picture processing through the user input device 10U. According to some embodiments, the user can connect multiple video source devices (which may be referred to as the video source devices #1, #2, etc. for better comprehension) to multiple video input ports of the display device 10, such as the video input ports P_in(N) and P_in(N+1), through two or more cables to allow the display device 10 to simultaneously display multiple pictures in a multi-picture processing mode such as a PiP/PbP mode, but the invention is not limited thereto. In some embodiments, the user can connect a single video source device (which may be referred to as the video source device #0 for better comprehension) to a certain video input port of the display device 10, such as the video input port P_in(N), through a single cable to allow the display device 10 to simultaneously display multiple pictures in the multi-picture processing mode such as the PiP/PbP mode.

In the above embodiments, examples of the video source devices #0, #1, #2, etc. may include (but are not limited to): personal computers such as desktop computers and laptop computers.

Figure 2:
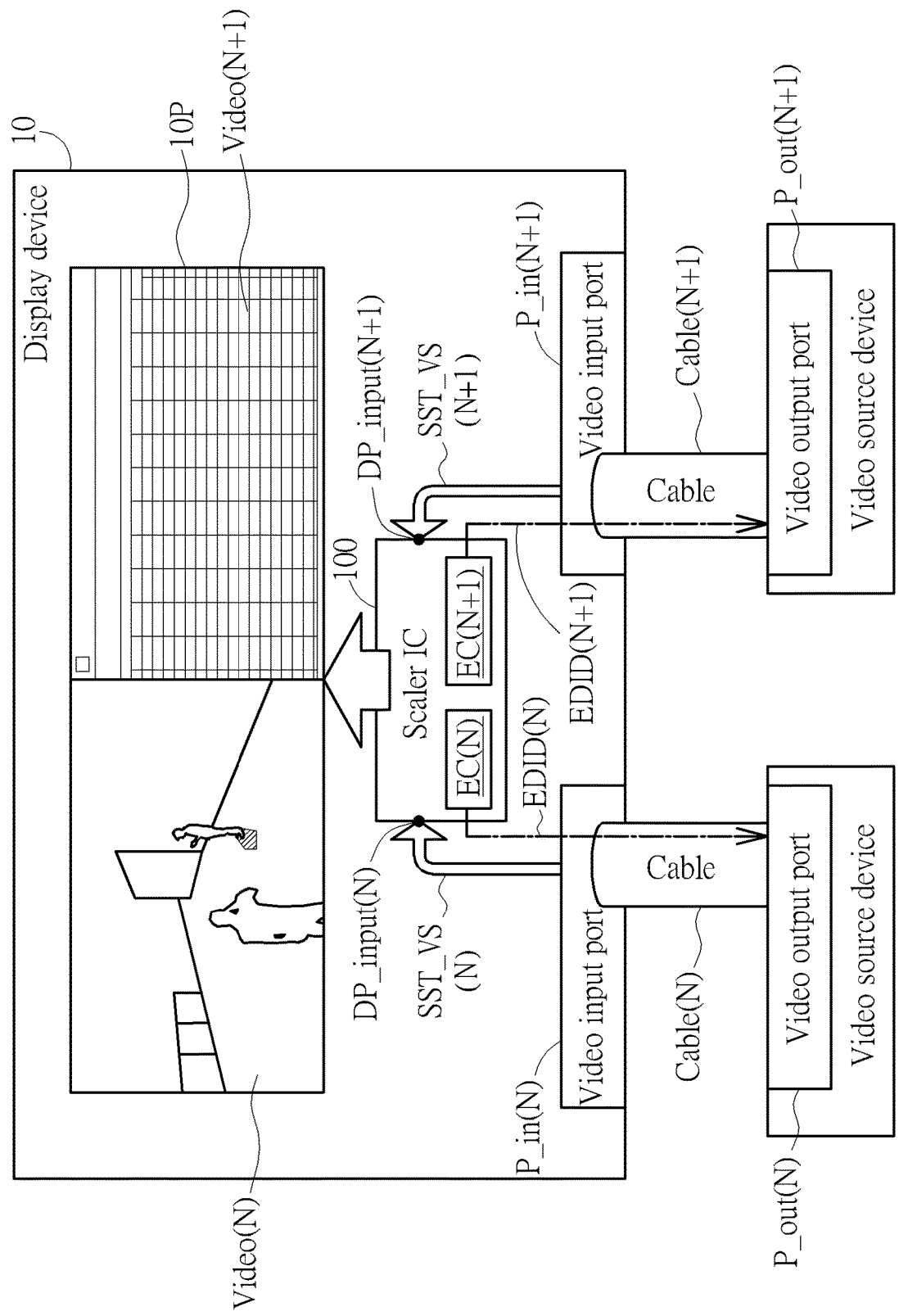
FIG. 2 illustrates a first control scheme of a method for performing multi-picture processing in a display device such as the display device shown in FIG. 1 according to an embodiment of the present invention, where the method can be applied to the display device shown in FIG. 1 and the scaler IC therein.

FIG. 2 illustrates a first control scheme of a method for performing multi-picture processing in a display device such as the display device 10 shown in FIG. 1 according to an embodiment of the present invention, where the method can be applied to the display device 10 shown in FIG. 1 and the scaler IC 100 therein. According to this embodiment, the user can connect the respective video output ports P_out(N) and P_out(N+1) of the video source devices #1 and #2 through the cables Cable(N) and Cable(N+1) to the video input ports P_in(N) and P_in(N+1) of the display device 10 to allow the display device 10 to simultaneously display multiple pictures such as partial pictures Video(N) and Video(N+1) in the multi-picture processing mode (e.g., the PiP/PbP mode).

For example, the control circuit 100C in the scaler IC 100 can declare that SST is supported (e.g., the display device 10 comprising the scaler IC 100 supports SST) through the video input ports P_in(N) and P in(N+1), and control the EDID circuits EC(N) and EC(N+1) to transmit the first set of EDID EDID(N) and the second set of EDID EDID(N+1) to the video source devices #1 and #2 through the video input ports P_in(N) and P in(N+1), respectively, for performing extended display identification (e.g. extended display capability identification). In addition, the control circuit 100C can receive a first SST video stream such as the SST video stream SST VS(N) from the video output port P_out (N) of the video source device #1 through the cable Cable (N), the video input port P_in(N) and the video input terminal DP input(N), and can receive a second SST video stream such as the SST video stream SST VS(N+1) from the video output port P_out(N+1) of the video source device #2 through the cable Cable(N+1), the video input port P_in(N+1) and the video input terminal DP_input(N+1). Under the control of the scaler IC 100 (e.g., the control circuit 100C therein), the display device 10 simultaneously displays the partial pictures Video(N) and Video(N+1) respectively corresponding to the SST video streams SST_VS(N) and SST_VS(N+1) in the multi-picture processing mode (e.g., the PiP/PbP mode).

Figure 3:
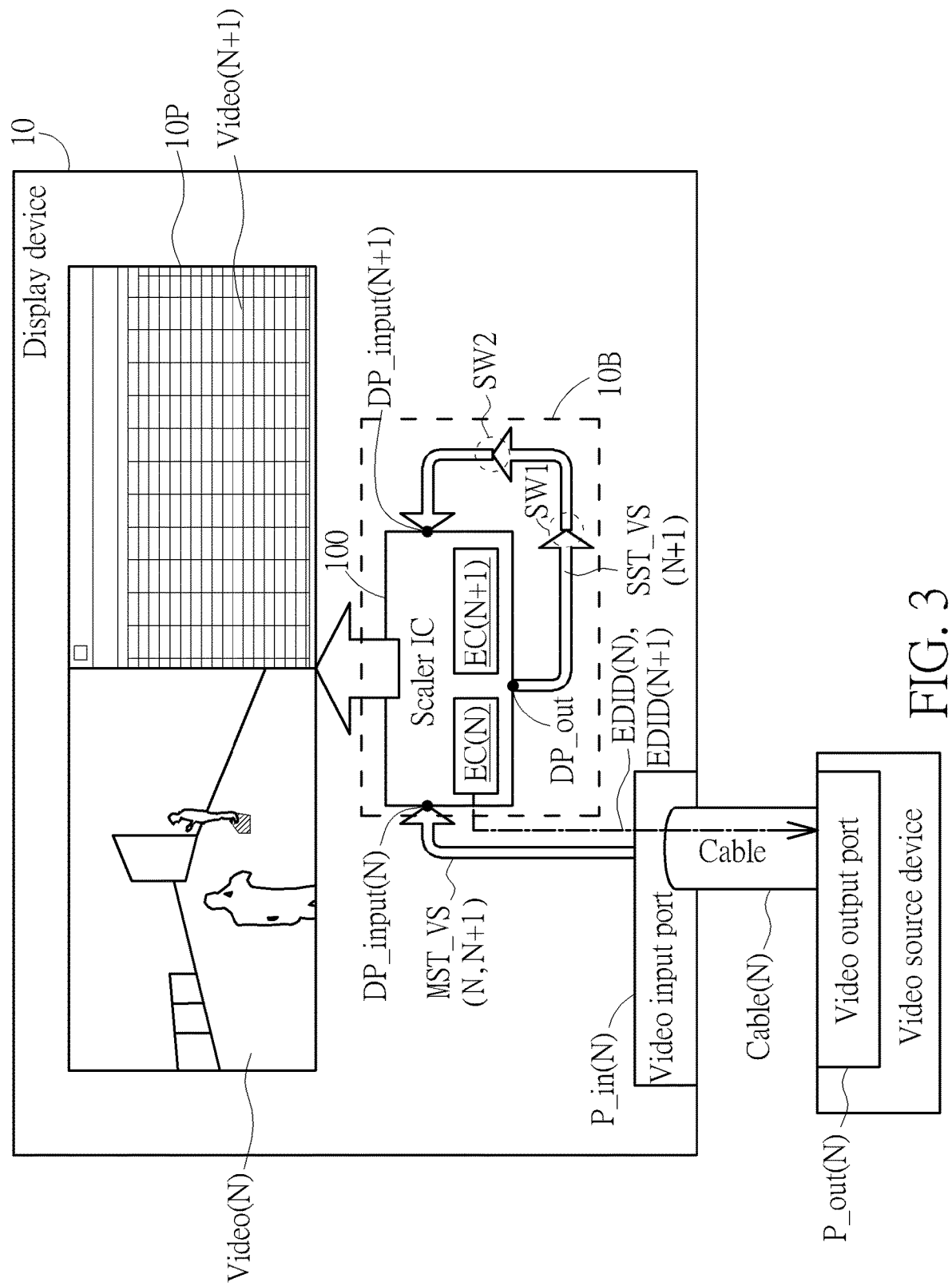
FIG. 3 illustrates a second control scheme of the method according to an embodiment of the present invention.

FIG. 3 illustrates a second control scheme of the method according to an embodiment of the present invention. According to this embodiment, the user can connect a video output port P_out(N) of the video source device #0 to the video input port P_in(N) of the display device 10 through a single cable Cable(N) to allow the display device 10 to simultaneously display multiple pictures such as the partial pictures Video(N) and Video(N+1) in the multi-picture processing mode (e.g., the PiP/PbP mode).

For example, when the control signal CTRL indicates to enable the multi-picture processing (e.g., the control signal CTRL indicates that the multi-picture processing should be enabled, as determined by the user), the control circuit 100C in the scaler IC 100 can declare that MST is supported (e.g., the display device 10 comprising the scaler IC 100 supports MST) through the video input port P_in(N), and control the EDID circuit EC(N) to transmit multiple sets of EDID to the video source device #0 through the video input port P_in(N), for performing extended display identification (e.g. extended display capability identification), where the multiple sets of EDID may comprise the first set of EDID EDID(N) and the second set of EDID EDID(N+1). In addition, when the control signal CTRL indicates to enable the multi-picture processing (e.g., the control signal CTRL indicates that the multi-picture processing should be enabled, as determined by the user), the control circuit 100C can receive the aforementioned MST video stream such as the MST video stream MST_VS(N, N+1) from the video output port P_out(N) of the video source device #0 through the single cable Cable(N), the video input port P_in(N) and the video input terminal DP_input(N) to be the first video input signal, analyze the MST video stream to generate a first SST video stream such as the SST video stream SST_VS(N) and a second SST video stream such as the SST video stream SST VS(N+1), send the second SST video stream such as the SST video stream SST VS(N+1) through the video output terminal DP_out to be the video output signal, and receive the video output signal through the video input terminal DP input(N+1) to be the second video input signal, to allow the scaler IC 100 to generate a combination picture according to the first SST video stream such as the SST video stream SST_VS(N) and the second SST video stream such as the SST video stream SST_VS(N+1), for being displayed by the display output module 10P. Under the control of the scaler IC 100 (e.g., the control circuit 100C therein), the display device 10 simultaneously displays the partial pictures Video(N) and Video(N+1) respectively corresponding to the SST video streams SST_VS(N) and SST_VS(N+1) in the multi-picture processing mode (e.g., the PiP/PbP mode), where the combined picture comprises the partial pictures Video(N) and Video(N+1).

As shown in FIG. 3, when the control signal CTRL indicates to enable the multi-picture processing (e.g., the control signal CTRL indicates that the multi-picture processing should be enabled, as determined by the user), the video input terminal DP_input(N+1) is coupled to the video output terminal DP_out through a data path on the main circuit board 10B. More particularly, the MST video stream MST_VS(N, N+1) is input into the video input terminal DP_input(N), and the SST video stream SST_VS(N+1) is input into the video input terminal DP_input(N+1) under the control of the scaler IC 100 (e.g., the control circuit 100C therein), to allow the display device 10 to be coupled to the video source device #0 through only the single cable Cable (N) (rather than multiple cables) to use the display output module 10P to simultaneously display the partial pictures Video(N) and Video(N+1). In addition, when the control signal CTRL indicates to disable the multi-picture processing (e.g., the control signal CTRL indicates that the multi-picture processing should be disabled, as determined by the user), the control circuit 100C can declare that SST is supported (e.g., the display device 10 comprising the scaler IC 100 supports SST) through the video input port P_in(N), and control the EDID circuit EC(N) to transmit only the first set of EDID EDID(N) to the video source device #0 through the video input port P_in(N), but the present invention is not limited thereto. For example, when the video source device #0 replaces the MST video stream with an SST video stream, the control circuit 100C can control the EDID circuit EC(N) to transmit only the first set of EDID EDID(N) to the video source device #0 through the video input port P_in(N).

Based on the architecture shown in FIG. 3, the present invention can simultaneously prevent various related art problems, such as the problem of multiple cables occupying limited space, the problem of needing manual adjustment, the problem of multiple sets of screen setting options, etc.

In any of the embodiments respectively shown in FIG. 2 and FIG. 3, the partial pictures Video(N) and Video(N+1) can be illustrated as the left half and the right half of the entire picture/screen, to indicate that the multi-picture processing can be implemented as the PbP processing, but the present invention is not limited thereto. For example, the respective sizes of the partial pictures Video(N) and Video (N+1) may vary. For another example, any partial picture of the partial pictures Video(N) and Video(N+1) and the other partial picture of the partial pictures Video(N) and Video (N+1) can be illustrated as a main partial picture that occupies most of the display region (e.g., the background region outside a sub-window in the entire picture/screen) and a secondary partial picture that occupies a small part of the display region (e.g., the sub-window), respectively, to indicate that the multi-picture processing can be implemented as the PiP processing.

According to some embodiments, the control circuit 100C can configure the multiple sets of EDIDs to conform to a set of predetermined picture parameters of the multi-picture processing (e.g., the respective sizes, resolutions, etc. of the partial pictures Video(N) and Video(N+1)), to guide the video source device #0 to generate the MST video stream carrying the picture data conforming to the set of predetermined picture parameters according to the multiple sets of EDID, making the partial pictures Video(N) and Video(N+1) respectively corresponding to the SST video streams SST_VS(N) and SST_VS(N+1) within the combination picture automatically conform to the set of predetermined picture parameters. Therefore, the user does not need to make any manual adjustment.

Figure 4:
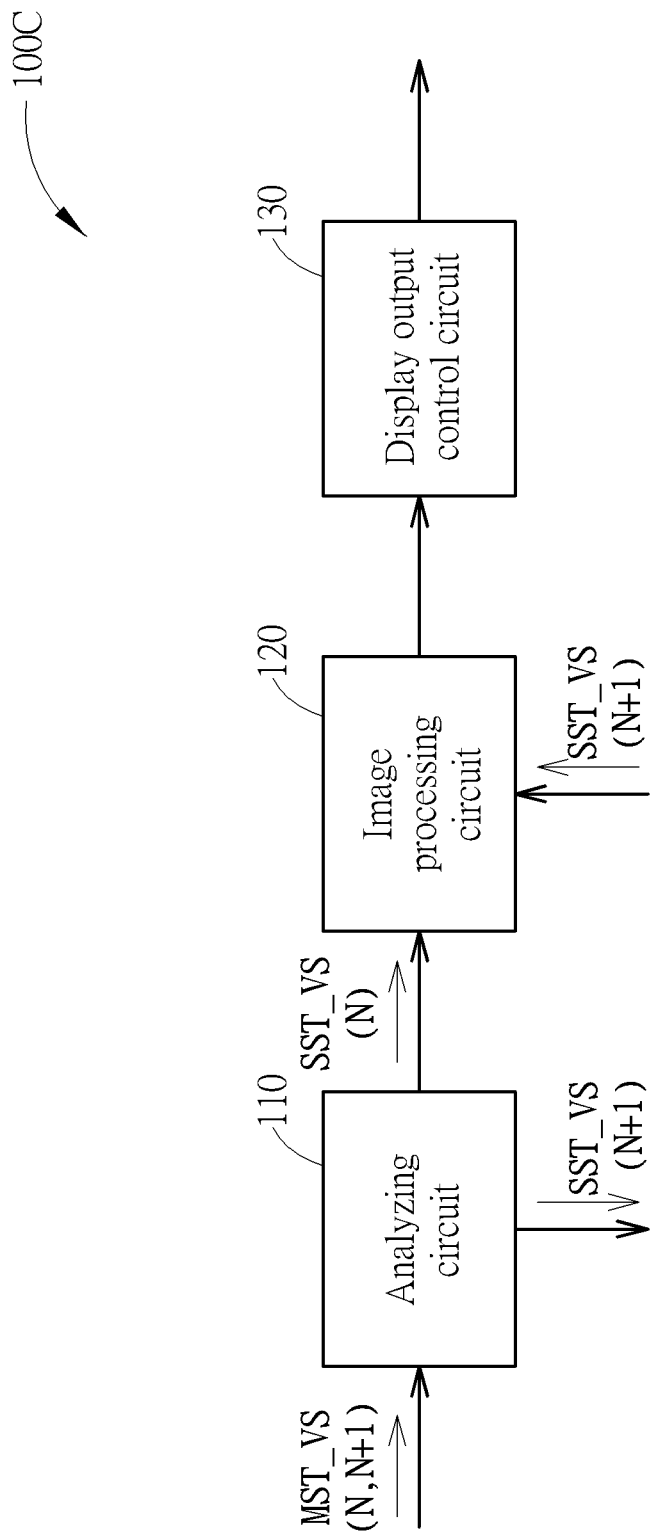
FIG. 4 illustrates some implementation details of the control circuit shown in FIG. 1 according to an embodiment of the present invention.

FIG. 4 illustrates some implementation details of the control circuit 100C shown in FIG. 1 according to an embodiment of the present invention. The control circuit 100C may comprise multiple sub-circuits such as an analyzing circuit 110, an image processing circuit 120 and a display output control circuit 130, and may utilize the multiple sub-circuits to perform associated operations, for example:

(1) utilize the image processing circuit 120 to perform the image processing, in particular, the multi-picture processing;
(2) utilize the display output control circuit 130 to perform the display output control; and
(3) utilize the analyzing circuit 110 to perform the video stream analysis, and more particularly, analyze the above-mentioned MST video stream such as the MST video stream MST_VS(N, N+1) to convert the MST video stream into the multiple SST video streams such as the SST video streams SST_VS(N) and SST_VS(N+1), for the image processing circuit 120 to perform the image processing such as the multi-picture processing. For brevity, similar descriptions for this embodiment are not repeated in detail here.

Figure 5:
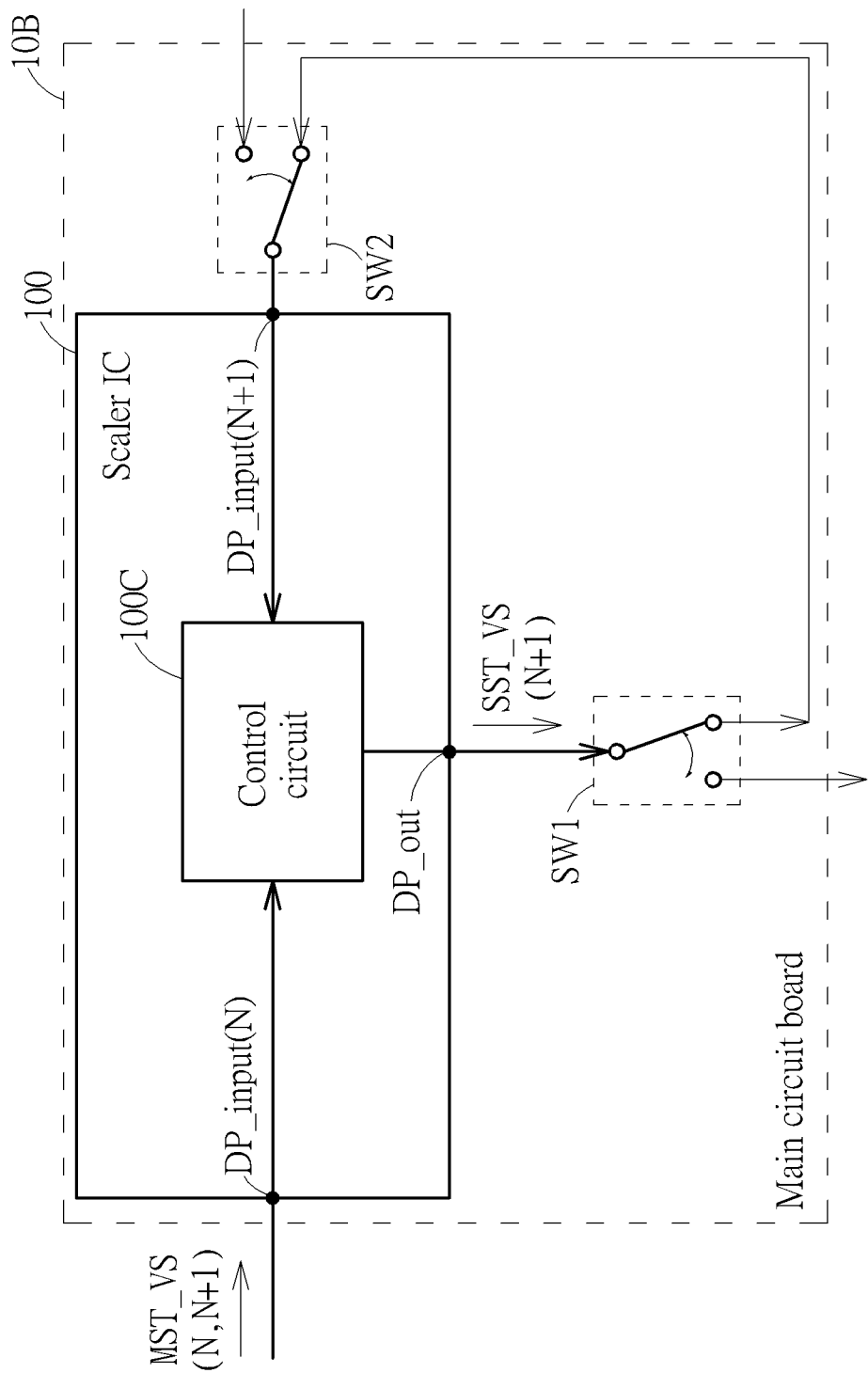
FIG. 5 illustrates some implementation details of the main circuit board shown in FIG. 1 according to an embodiment of the present invention.

FIG. 5 illustrates some implementation details of the main circuit board 10B shown in FIG. 1 according to an embodiment of the present invention. The switching circuit SW1 is positioned on multiple data paths passing through the video output terminal DP_out, and can perform path switching between these data paths, and these data paths may comprise the data path from the video output terminal DP_out to the outside (e.g. a video output port (not shown) of the display device 10) of the main circuit board 10B, and the data path from the video output terminal DP_out to the switching circuit SW2. In addition, the switching circuit SW2 is positioned on multiple data paths passing through the video input terminal DP_input(N+1), and can perform path switching between these data paths, and these data paths may comprise the data path from the switching circuit SW1 to the video input terminal DP_input(N+1), and the data path from the outside (e.g. the video input port P_in(N+1)) of the main circuit board 10B to the video input terminal DP input(N+1). Additionally, the control circuit 100C can generate multiple control signals (not shown) to control multiple components of the main circuit board 10B, such as the switching circuits SW1 and SW2, to configure the switching circuits SW1 and SW2 to enable the data path that starts from the video output terminal DP_out, passes through the switching circuits SW1 and SW2 and reaches the video input terminal DP_input(N+1). For brevity, similar descriptions for this embodiment are not repeated in detail here.

It is an advantage of the present invention that, through carefully designed display control mechanism, the scaler IC 100 of the present invention can properly perform the multi-picture processing in a situation where the single cable Cable(N) is connected between a video source device (e.g. the single video source device) and the display device 10. In addition, the scaler IC 100 of the present invention can configure the multiple sets of EDID according to the associated information of the display output module 10P, such as the current resolution, etc., for the video source device to provide the video stream as required by the multi-picture processing according to the multiple sets of EDID, to make the display device 10 automatically adjust the resolution to achieve the optimal display ratio. Additionally, when the control signal CTRL indicates to disable the multi-picture processing, the scaler IC 100 of the present invention can declare that SST is supported through the video input port P_in(N), and transmit only the first set of EDID EDID(N) to the video source device through the video input port P_in (N), so that only a set of screen setting options corresponding to the first video input signal (e.g., the display properties of a single desktop), rather than multiple sets of screen setting options (e.g., the respective display properties of multiple desktops), appears in the display setting mechanism of the video source device (e.g., a certain setting window of an operating system running on the video source device). In comparison with the related art, the scaler IC of the present invention can realize a display device with reliable display control without introducing any side effect or in a way that is less likely to introduce a side effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scaler integrated circuit (IC), applicable to performing multi-picture processing in a display device, the scaler IC comprising:
   a control signal input terminal, arranged to receive a control signal from a user input device in the display device, wherein the control signal indicates whether to enable the multi-picture processing;
   a first video input terminal, arranged to receive a first video input signal;
   a second video input terminal, arranged to receive a second video input signal;
   a video output terminal, arranged to transmit a video output signal from the scaler IC;
   a first Extended Display Identification Data (EDID) circuit, arranged to generate a first set of EDID, for performing extended display identification through a first video input port of the display device;
   a second EDID circuit, arranged to generate a second set of EDID, for performing extended display identification through a second video input port of the display device; and
   a control circuit, coupled to the control signal input terminal, the first video input terminal, the second video input terminal, the video output terminal, the first EDID circuit and the second EDID circuit, arranged to control operations of the scaler IC;
   wherein when the control signal indicates to enable the multi-picture processing, the control circuit receives a Multi-Stream Transport (MST) video stream from a video source device through the first video input port and the first video input terminal to be the first video input signal, analyzes the MST video stream to generate a first Single Stream Transport (SST) video stream and a second SST video stream, sends the second SST video stream through the video output terminal to be the video output signal, and receives the video output signal through the second video input terminal to be the second video input signal, to allow the scaler IC to generate a combination picture according to the first SST video stream and the second SST video stream, for being displayed by a display output module within the display device.

2. The scaler IC of claim 1, wherein when the control signal indicates to enable the multi-picture processing, the control circuit controls the first EDID circuit to transmit multiple sets of EDID to the video source device through the first video input port, for performing extended display identification.

3. The scaler IC of claim 2, wherein the multiple sets of EDID comprise the first set of EDID and the second set of EDID.

4. The scaler IC of claim 2, wherein the control circuit configures the multiple sets of EDID to conform to a set of predetermined picture parameters of the multi-picture processing, to guide the video source device to generate the MST video stream carrying picture data conforming to the set of predetermined picture parameters according to the multiple sets of EDID, making partial pictures respectively corresponding to the first SST video stream and the second SST video stream within the combination picture automatically conform to the set of predetermined picture parameters.

5. The scaler IC of claim 1, wherein the combination picture comprises a first partial picture and a second partial picture respectively corresponding to the first SST video stream and the second SST video stream.

6. The scaler IC of claim 5, wherein the MST video stream is input into the first video input terminal, and the second SST video stream is input into the second video input terminal under control of the control circuit, to allow the display device to be coupled to the video source device through only a single cable to use the display output module to simultaneously display the first partial picture and the second partial picture.

7. The scaler IC of claim 5, wherein under control of the control circuit, the first SST video stream and the second SST video stream are respectively input into a first input terminal and a second input terminal of an image processing circuit within the control circuit, to allow the display device to be coupled to the video source device through only a single cable to use the display output module to simultaneously display the first partial picture and the second partial picture.

8. The scaler IC of claim 1, wherein the multi-picture processing comprises one or both of Picture-in-Picture (PiP) processing and Picture-by-Picture (PbP) processing.

9. The scaler IC of claim 1, wherein when the control signal indicates to enable the multi-picture processing, the second video input terminal is coupled to the video output terminal through a data path on a main circuit board within the display device.

10. The scaler IC of claim 1, wherein when the control signal indicates to disable the multi-picture processing, the control circuit declares that SST is supported through the first video input port, and controls the first EDID circuit to transmit only the first set of EDID to the video source device through the first video input port.

11. The scaler IC of claim 1, wherein when the video source device replaces the MST video stream with an SST video stream, the control circuit controls the first EDID circuit to transmit only the first set of EDID to the video source device through the first video input port.

* * * * *